No. 738,389. Patented September 8, 1903.

UNITED STATES PATENT OFFICE.

WILLIAM A. OTTO WUTH, OF PITTSBURG, PENNSYLVANIA, ASSIGNOR TO INTERNATIONAL CEMENT COMPANY, A CORPORATION OF NEW JERSEY.

MANUFACTURE OF CEMENT.

SPECIFICATION forming part of Letters Patent No. 738,389, dated September 8, 1903.

Application filed June 24, 1902. Serial No. 113,022. (No specimens.)

*To all whom it may concern:*

Be it known that I, WILLIAM A. OTTO WUTH, a resident of Pittsburg, in the county of Allegheny and State of Pennsylvania, have invented a new and useful Improvement in the Manufacture of Cement, (Case No. 2;) and I do hereby declare the following to be a full, clear, and exact description thereof.

My invention relates to the manufacture of cement similar to that known as "Portland" cement.

In my Patent No. 643,856, granted February 20, 1900, is described and claimed a process of manufacturing from blast-furnace slag a cement which is similar to the ordinary Portland cement. In the said patent the various ingredients of Portland cement are set out in detail, and it is pointed out that the principle ones of these ingredients are found in blast-furnace slag and lime. It is also pointed out that the slag contains a considerable quantity of sulfur in the form of a sulfid, which is quite injurious as an ingredient in cement and when present in large quantities renders the cement worthless. The object of the method described in the said patent is to so treat the ingredients that the sulfur will be eliminated or, more strictly speaking, converted into a harmless sulfate. The process described consisted in hydrating lime with a solution of a salt which will evolve oxygen at a high temperature, mixing the same with powdered blast-furnace slag, and then burning the mixture, the oxygen evolved by the salt serving to reduce the sulfid to a sulfate. Any salt having the property of evolving oxygen at a high temperature is suited for carrying out the process; but preferably nitrate of sodium is employed by reason of its cheapness and for the further reason that it adds to the cement the desired amount of soda, which is a desirable feature, as lime and slag are usually somewhat deficient in the quantity of soda necessary to produce the best cement. I am aware that the same results may be secured by grinding and mixing the ingredients in a dry state instead of using a solution of the nitrate salt for hydrating the lime, as in the former patent. The present application, therefore, has for its object to claim the mixing of the ingredients in a dry state in order to secure the same results as are secured in my former patent and obviating the necessity of drying the mixture, as is necessary when the oxygen-evolving salt is added as a solution.

In carrying out the process I may employ either lime or limestone, it being entirely immaterial, as the final burning will reduce the limestone to lime. Whichever form of lime-bearing agent is employed, I proceed by grinding the same in any preferred manner and in any preferred apparatus and preferably simultaneously mixing and grinding therewith the nitrate salt. After the lime-bearing agent and nitrate salt have been reduced to a powder they are mixed with the proper proportion of powdered blast-furnace slag. As the slag now comes from the blast-furnace in a powdered form it can be mixed with the powdered limestone and nitrate salt without first grinding the slag, the mixing being done in any preferred way, but preferably in a pebble-mill. Should slag which is not powdered be used, it will of course have to be powdered before being mixed with the other ingredients, and it may be ground in the same mill and simultaneously with the limestone and nitrate salt. In that way the mixing would be done in the grinding. In any event the resultant mass is a thorough mixture of a nitrate salt, blast-furnace slag, and a lime-bearing agent, such as limestone or lime. This mixture without any preliminary drying will then be burned in the usual way of burning cement, being exposed to a high temperature for a number of hours. The result of this burning is to reduce the limestone, in case the same is used, to lime, and also to produce a trisilicate of lime, which is the important ingredient of the Portland cement. The temperature necessary for producing this trisilicate is nearly 3,000° Fahrenheit; but considerably below this temperature the nitrate salt will be broken up and the oxygen freed and caused to unite with the sulfid which is present in the slag, reducing the same to a sulfate, which is perfectly harmless. The soda present will become part of the cement, and this is of advantage, because slag is usually low in soda, and all good cement should have not less than one per cent. of this element, and this proportion the nitrate salt supplies.

The proportion of ingredients employed will depend upon the analysis of the slag; but in general it may be said that about three portions of lime will be used to one portion of silica. I have found that it is well to employ from two and one-half to four pounds of nitrate of sodium, one hundred pounds of slag, and from fifty to fifty-five pounds of burned lime or from one hundred to one hundred and ten pounds of limestone. In this way I am able to produce a cement of high grade similar to Portland cement, one analysis of the cement so formed showing it to contain about twenty-three per cent. of silica, sixty-one per cent. of lime, nine per cent. of alumina, one and one-half per cent. of soda, small proportions of peroxid of iron, magnesia, and manganese, and only nine-tenths per cent. of sulfur, and this was present as a harmless sulfate of lime.

In the manufacture of the cement according to this process it will be understood that in place of the nitrate of sodium any other salt which will evolve oxygen at a high temperature may be employed, any one of the salts enumerated in my patent above referred to being suitable for this purpose; but nitrate of sodium is preferred, first, on account of its cheapness, and, second, because it increases the proportion of soda in the cement.

I am aware that it has been proposed to make cement by mixing together and pulverizing lime or limestone and furnace-slag, then treating the same with an aqueous solution of an alkali salt, after which the mass was formed into bricks or balls and dried, burned, and comminuted in the usual way. The alkali salt was added for the purpose of supplying soda to the cement, and while at times saltpeter was employed it was not understood that the oxygen freed in the burning of the mixture produced any result. I am also aware that it has been proposed to mix slag with slaked lime and some alkali salt which will not evolve oxygen at a high temperature either in the wet or in a dry state, but without the subsequent burning of the mixture. I am not aware that it has ever heretofore been proposed to mix together blast-furnace slag, a lime-bearing agent, and a nitrate salt in the dry state and afterward burn this mixture.

What I claim as my invention, and desire to secure by Letters Patent, is—

1. The herein-described process of forming cement which consists in grinding and mixing together in a dry state blast-furnace slag, a lime-bearing agent and a salt which will evolve oxygen at a high temperature, and then burning the mixture.

2. The herein-described process of forming cement which consists in grinding and mixing together in a dry state blast-furnace slag, a lime-bearing agent and a nitrate salt, and then burning the mixture.

3. The herein-described process of forming cement which consists in grinding and mixing together in a dry state blast-furnace slag, a lime-bearing agent and nitrate of sodium, and then burning the mixture.

4. The herein-described process of forming cement which consists in grinding and mixing together blast-furnace slag, limestone and a salt which will evolve oxygen at a high temperature, and then burning the mixture.

5. The herein-described process of forming cement which consists in grinding together a lime-bearing agent and a salt which will evolve oxygen at a high temperature, mixing therewith powdered blast-furnace slag, and then burning the mixture.

In testimony whereof I, the said WILLIAM A. OTTO WUTH, have hereunto set my hand.

WILLIAM A. OTTO WUTH.

Witnesses:
ROBERT C. TOTTEN,
F. W. WINTER.